United States Patent [19]

Yano et al.

[11] 4,375,838

[45] Mar. 8, 1983

[54] ELECTRONIC BALANCE

[75] Inventors: Shozo Yano, Uji; Yasuhiro Hujinaga, Kitaenmachi; Toshio Kawara, Kyoto; Akira Komoto, Otsu, all of Japan

[73] Assignee: Shimadzu Corporation, Kyoto, Japan

[21] Appl. No.: 283,534

[22] Filed: Jul. 15, 1981

[30] Foreign Application Priority Data

Jul. 17, 1980 [JP] Japan ................................. 55-98632
Sep. 30, 1980 [JP] Japan ................................ 55-137243

[51] Int. Cl.³ .......................................... G01G 23/01
[52] U.S. Cl. ...................................... 177/50; 177/212; 177/DIG. 3
[58] Field of Search .................. 177/212, DIG. 3, 25, 177/165, 185, 50, 210 FP, 200; 364/567

[56] References Cited

U.S. PATENT DOCUMENTS 3,916,173 10/1975 Williams ........................ 177/DIG. 3
4,316,517 2/1982 Jonath ............................. 177/50 X

*Primary Examiner*—Joseph W. Hartary
*Attorney, Agent, or Firm*—Koda and Androlia

[57] ABSTRACT

An electronic balance includes a weighing means for producing digital output signals as a measured value in response to a force induced upon a tray, a first memory for storing the mass of a reference weight, a discriminator for signalizing the existence and non-existence of an object on the tray, a second memory for storing a corrected value obtained by differentiating between a measured value of the reference weight and the mass stored in the first memory when the discriminator signalizes that no object is placed on the tray, an arithmetic unit for correcting a measured value signalized by the weighing means in accordance with the corrected value stored in the second memory when the discriminator signalizes that an object exists on the tray, and an output unit for permitting of visual inspection of the arithmetic results obtained by the arithmetic unit.

8 Claims, 8 Drawing Figures

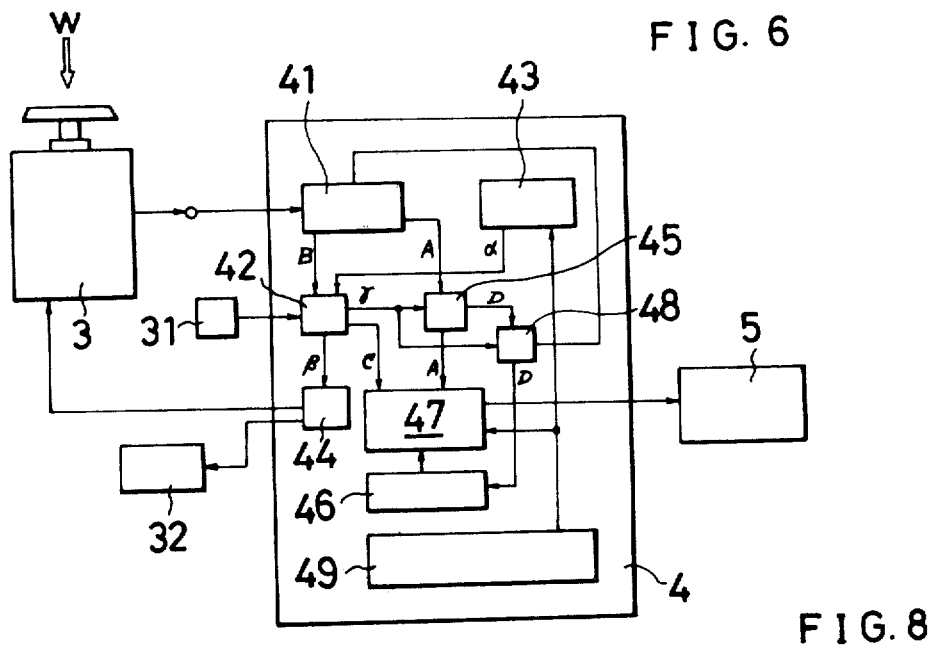
FIG. 6
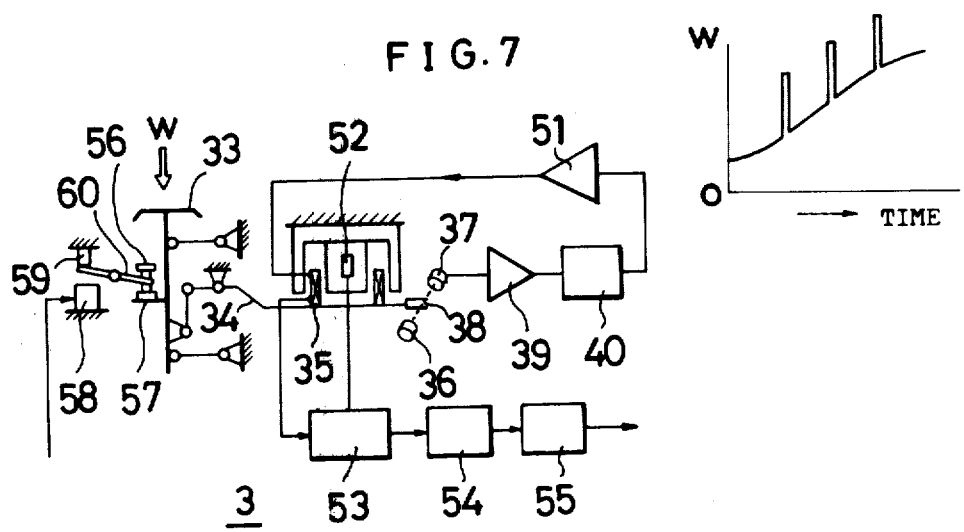
FIG. 7
FIG. 8

ELECTRONIC BALANCE

THE BACKGROUND OF THE INVENTION

1. Field of the Invention

The present invention relates to an electronic balance, and more particularly, to an electronic balance capable of performing an automatic high-precision correction of a measured value by reference to one or more loaded reference weights, wherein a positive or negative addition of the reference weight or weights is signalized at a desired interval or alternatively in response to each measurement.

2. Description of the Prior Art

In the known optical or electric balances in which a decline on the scale is visually read, deviations from the reference weight tend to increase its non-linear tendency as a more strict reading is required or as an expected resolution to the full scale is finer. The non-linear tendency is likely to adversely affect the performance of a high resolution balance, such as a microbalance or a semi-microbalance. In a known type of electromagnet balance the non-linear tendency is likewise a problem, which is caused by unavoidable characteristics of its components and circuits.

Under the known balances, therefore, it is required to obtain a corrected curve by reference to the reference weight before an object is weighed on the balance. This is trouble-some and time-consuming.

In addition, the accuracy of the known balances depends upon the accurate measurement of loaded reference weights, and accordingly, it is essential to employ reference weights whose masses are precisely measured. Such reference weights are expensive, thereby increasing the production cost. Even if such expensive reference weights are employed, their masses are subjected to variation due to wearing-out for a long period of use. The readjustment is frequently required.

In general, an electronic balance is subjected to thermal changes in the room temperatures and/or those occurring within the balance itself. Such thermal changes affect the sensitivity of the balance. To overcome the problems likely to occur due to thermal changes, it is required to warm up the balance before use, and to wait for thermal stabilization. When the stabilization is obtained, a manual correction is performed. The lack of this manual correction leads to an inaccurate measurement.

The present invention aims at overcoming the problems and difficulties mentioned above with respect to the known balances, and has for its object to provide an improved electronic balance capable of automatic correction by reference to one or more loaded reference weights in a simplified procedure.

Another object of the present invention is to provide an improved electronic balance which can be operated without the necessity for warming up until a thermal stability is reached, thereby permitting of immediate accurate measurement.

A further object of the present invention is to provide an improved electronic balance of simplified construction without the use of extra components for manual correction, such as variable resistors, thereby simplifying the adjustment of measuring sensitivity.

Other objects and advantages of the present invention will become more apparent from the following description when taken in connection with the accompanying drawings which show, for the purpose of illustration only, preferred embodiments in accordance with the present invention.

SUMMARY OF THE INVENTION

According to one advantageous aspect of the present invention an electronic balance includes a weighing means for producing digital output signals as a measured value in response to a force induced upon a tray, a first memory for storing the mass of a reference weight, a discriminator for signalizing the existence and non-existence of an object on the tray, a second memory for storing a corrected value obtained by differentiating between a measured value of the reference weight and the mass stored in the first memory when the discriminator signalizes that no object is placed on the tray, an arithmetic unit for correcting a measured value signalized by the weighing means in accordance with the corrected value stored in the second memory when the discriminator signalizes that an object exists on the tray, and an output unit for permitting of visual inspection of the arithmetic results obtained by the arithmetic unit.

BRIEF DESCRIPTION OF THE DRAWING

FIG. 6 is a block diagram showing a further modified version of the embodiment;

FIG. 7 is a schematic view showing an internal construction of the embodiment of FIG. 6; and FIG. 8 is a graph showing changes of weights with time.

DETAILED DESCRIPTION OF THE INVENTION

Figure 1:
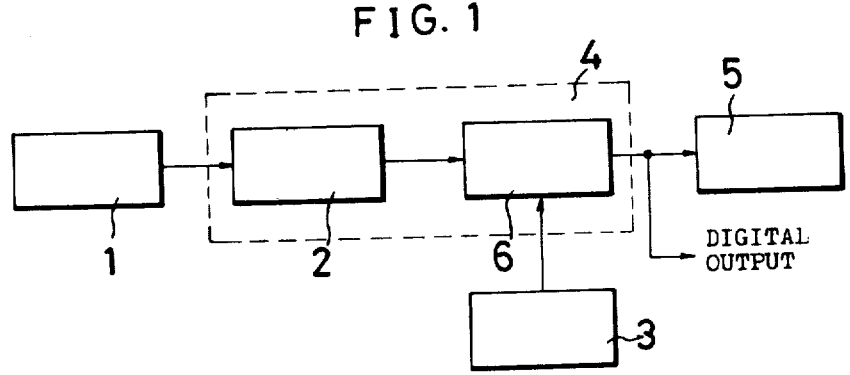
FIG. 1 is a block diagram showing the sequential operations of one embodiment of the invention.

Referring to FIG. 1 the illustrated embodiment includes an input unit 1 for inputting a corrected value for the reference weight, a memory 2 which stores the corrected value, a weighing section 3, an arithmetic unit 6 and a display 5. The display means any devices which permits of visual inspection of resulting data. The input unit 1 is constructed in the form of a keyboard to input a difference between the mass of a reference weight and the actual weight output by the balance when the same is placed thereon. The arithmetic unit 6 performs correction to ensure that the output of the weighting section 3 may be linear on the basis of the value input by the input unit 1.

Figure 3:
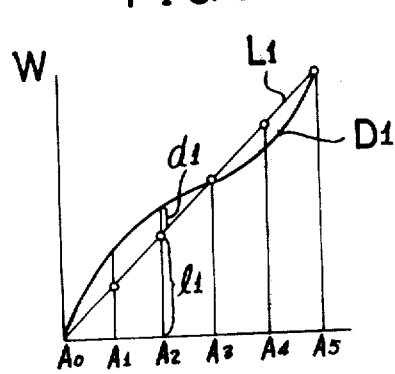
FIG. 3 is a characteristics graph of the embodiment in FIG. 1.

The illustrated embodiment performs such a correction as shown in FIG. 3, in which the X axis indicates points of correction (Points $A_0$ to $A_5$) while the Y axis indicates outputs W corresponding to each of the points of correction. Each point of correction corresponds to each applied load. In FIG. 3 the points of correction are equally spaced, but it is not always necessary. The graph $D_1$ shows a non-linear output graph covering the range of correction, and the graph $L_1$ is a corrected linear graph, which will be referred to as the corrector.

Taking for example the value on the corrector $L_1$ corresponding to Point $A_2$, it reads as $l_1$. This value is input to the input unit 1. The value $l_1$ is stored at the memory 2. Likewise, each corrected value is stored in memory. At this stage, an unknown load is applied to the balance, which load corresponds to the reference weight at Point $A_2$. The arithmetic unit 6 subtracts the value $d_1$ from the output produced by the balance in response to the applied load, thereby correcting it to the corrected value $l_1$ stored in the memory 2. The correction between each adjacent pair of Points is made from the corrector $L_1$. The corrected values obtained by the arithmetic unit 6 are output by the display 5 as a printed report or in a character form on a display screen.

Figure 2:
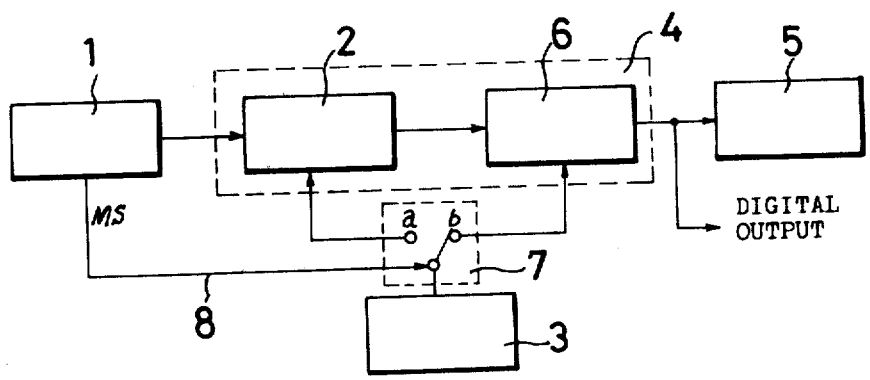
FIG. 2 is a block diagram showing the sequential operations of an alternative embodiment.

A modified version of the embodiment in FIG. 2 includes a switch 7, in addition to the input unit 1, the memory 2, the arithmetic unit 6 and the display 5, wherein the reference numeral 8 designates an output line from the input unit 1 led to the weighing section 3 of the balance. When an input signal is applied to the input unit 1, it is transmitted through the output line 8 to the switch 7 so as to close a contact (a) and store a correction data at the memory 2. This is the input mode. When in the measuring mode, the switch 7 is shifted to close a contact (b).

Figure 4:
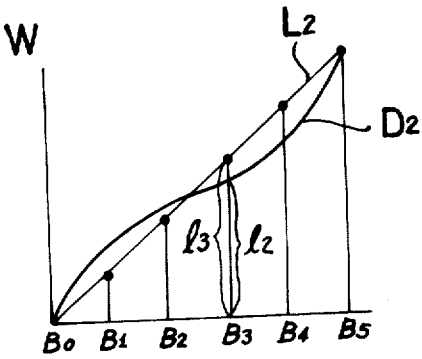
FIG. 4 is a characteristics graph of the embodiment in FIG. 2.

The modified embodiment shown in FIG. 2 performs such a correction as shown in FIG. 4, wherein the X-axis indicates points of correction (Points $B_0$ to $B_5$) while the Y-axis indicates outputs W corresponding to each of the points of correction. The graph $D_2$ indicates a non-linear graph showing actual outputs corresponding to each point of correction, and the graph $L_2$ is a corrector obtained by correcting the graph $D_2$.

When the input unit 1 is started by pressing a press-button, an input signal MS is produced whereby the switch 7 closes the contact (a) into the input mode. For example, if at Point $B_3$ an output for the reference weight $l_3$ reads $l_2$ the corrected value $l_3$ is stored at the memory 2 for the output $l_2$. In the same manner each corrected value is stored in memory correspondingly to the outputs at each Point of correction. When the system is to be entered into the measuring mode, the switch 7 closes the contact (b). At this stage, an unknown load is applied to the balance, which load corresponds to the reference weight at Point $B_3$. In response to the applied load the output $l_2$ from the balance is input to the arithmetic unit 6, which in turn corrects the output value to the corrected value $l_3$ stored at the memory 2. This is output by the display 5. The correction between each adjacent pair of points of correction are obtained by the corrector $L_2$.

For the memory 2 mentioned above an RAM including a C-MOS can be employed preferably with the use of a battery as an auxiliary power supply, whereby when the current supply is cut off, corrected values can be stored at any time. Alternatively, an EP-ROM can be employed.

Figure 5:
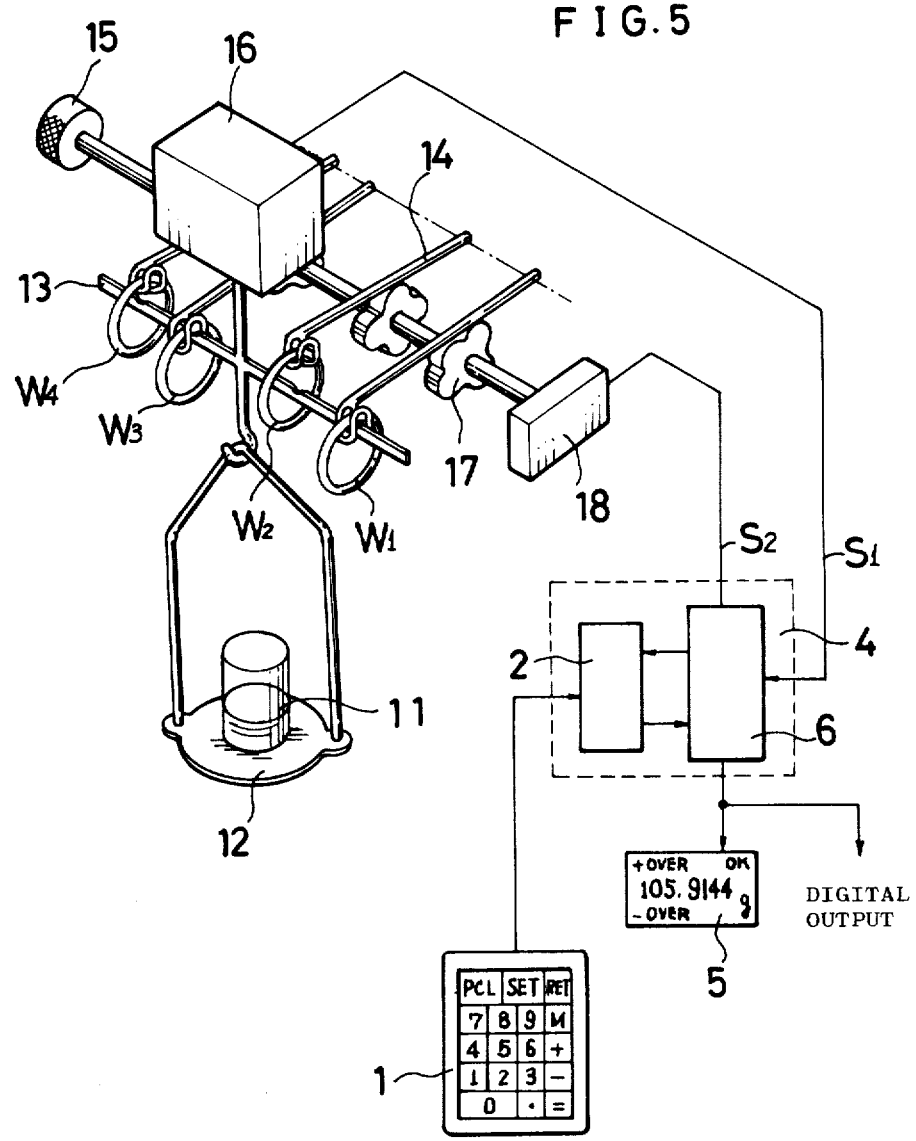
FIG. 5 is a schematic view showing an internal construction, particularly a weighing section in one embodiment.

Referring to FIG. 5 in which the weighing section 3 is schematically illustrated, this section includes a tray 12 on which a testpiece 11 is placed, the tray being directly connected to a measuring section 16, and four weights $W_1$ to $W_4$ having different masses and being supported on supporters 14 through a bar 13. More in detail, the balance additionally includes a knob 15 for optionally negating any of the weights by the rotation thereof with the help of a cam mechanism designed so as to lift the supporter to cause the weight to be free from the bar 13. The reference numeral 18 designates a rotary switch. The weighing section 3 is connected to the arithmetic unit 6 through the measuring section 16 and the rotary switch 18. In an automatic balance the knob 15 will be unnecessary. The memory 2 is preferably provided with a battery so as to effect memory even when the current supply is cut off, or the memory 2 uses an unvolatile memory means.

The measuring section 16 subtracts the total weight of the loaded weights W from the weight of the testpiece 11 on the tray 12, and transmits the measured value in the form of a signal $S_1$ to the arithmetic unit 6. The measuring section 16 includes a balancer (not shown) designed to ensure the state of equilibrium when no load is applied to the balance. The rotary switch 18 produces a signal $S_2$ and transmits it to the arithmetic unit 6. In response to the signal $S_2$ the arithmetic unit 6 determines either the addition (positive addition) or the subtraction (negative addition) of the loaded weights $W_1$ to $W_4$, and accordingly processes the signal $S_1$ and the masses of the reference weights stored at the memory 2. On the keyboard 1 the RCL key is to check the stored masses of each weight W, and the RET key is to initiate the measuring mode.

To visually examine the adequacy of the subtraction or addition of the loaded weights with respect to the weight of the testpiece 11 on the tray 12, the arithmetic unit 6 instructs the display 5 to indicate the state of operation whereby the display 5 indicates (+) or (−) OVER or OK.

In operation, the masses of each weight $W_1$ to $W_4$ are input to the keyboard 1. The masses thereof are previously measured by means of a separate high precision scale. For example, let it be that a weight having nominal weight of 20 g precisely weighs 20.0032 g, and that another having nominal weight of 80 g precisely weighs 79.3685 g. These precise values are input to the keyboard 1 by pressing the SET key, the keys for "20", the (=) key, the keys for "20.0032" and finally the M key for memory instruction. In this way these precise values are stored in memory.

The testpiece 11 is placed on the tray 12, and while rotating the knob 15, the display 5 is watched until the lamp "OK" is lighted. Until then the lamp will indicate (+) OVER or (−) OVER. It is necessary to rotate the knob 15 patiently until the lamp "OK" illuminates. In the embodiment shown in FIG. 5 the weights $W_1$ and $W_3$ are added, and the weights $W_2$ and $W_4$ are withdrawn from the bar 13, whereby the latter two weights are negated in measuring. This is transmitted to the arithmetic unit 6 as the signal $S_2$ through the rotary switch 18. The arithmetic unit 6 adds 79.3685 g for 80 g and 20.0032 g for 20 g, which are both stored at the memory 2, and further adds to them 6.5427 g obtained in the measuring section 16, which value is for all the weights except for the loaded weights W. In this way the total weight 105.9144 g is obtained, which is output by the display 5.

If any error is found in obtaining the masses of the loaded weights, the erroneous memory at the memory 2 can be corrected through the keyboard 1. For example, when a reference weight of 10 g is placed on the tray 12, and if the displayed output shows that the precise value be 0.0003 g lighter, the erroneous memory can be corrected by pressing the SET key, the keys for "10", the (=) key, the keys for "0.0003", the (−) key and finally the M key, whereby 0.0003 g is subtracted from the erroneous value in memory.

A further example of the embodiment will be described with reference to FIGS. 6 to 8:

Referring to FIG. 7 the weighing section 3 includes a tray 33 carried by a beam 34 which is provided with a coil 35 and a position detector 38 adapted to open and close the path of light passing between a light source 36 and a photocell 37. The output from the photocell 37 is transmitted to the coil 35 via a preamplifier 39, a PID control circuit 40 and a power amplifier 51, thereby energizing the coil 35. These elements constitute an electromagnetic force balancing servo-system. The current value of the coil 35 is output as a digital signal via a thermal sensor 52, a range switching circuit 53, a low-pass filter 54, and an A/D converter 55. A reference weight 56 is placed on a supporter 57 integral with the tray 33. The reference numeral 58 designates an electromagnet magnetized by signals sent as described below. To the electromagnet 58 a stop 59 is opposedly provided to stop a see-saw lever 60 from its further upward movement.

The control section 4 includes a discriminator 41 which can signalize the existence or non-existence of a testpiece on the tray. For example, if a signal has 30 or more counts, it will be safely understood that the testpiece is placed on the tray, and the data can be safely output to the measuring-in-process circuit (A). In contrast, if the signal has less than 30 counts, the data must be output to the stand-by circuit (C). A counter 43 produces periodic signals, that is, pulse signals α as at the intervals of 5 minutes, wherein the interval can be selected from 1 to 180 minutes. An AND circuit 42 (including a pulse generator) detects that no testpiece is placed on the tray 33, and that the pulse signals α are being emitted at given intervals. In response to this detection pulse signals β are output to the electromagnet 58 to magnetize it. Simultaneously, a timer 44 is energized to produce signals informing that the electromagnet 58 is being magnetized, which is output by a display 32 to indicate that the correction is under way. A first switch 45 and a second switch 48 switch circuits in response to pulse signals γ. A register 46 momentarily stores the weight value. An arithmetic unit 44, 77 corrects the measured value in the following manner:

Let it be that the weight value of a reference weight is K, the measured value is ω, and the measured value of a testpiece is W, the corrected weight value of the testpiece Wk will be expressed by $$Wk = (K \cdot W)/\omega$$

A programmer 49 gives various instructions. The results obtained in this way are output by a display or recorder 5. An instruction button 31 is operated to output so as to generate the electromagnet magnetizing signal β when desired.

In operation, when the electromagnet magnetizing signal β is output by the AND circuit 42 in response to the stand-by signal and the periodic pulse signal α transmitted thereto, and as a result, the see-saw lever 60 is attracted to the electromagnet 58, thereby causing the reference weight to set free from the tray 33. Thus its weight is negated in measuring. When upon the expiry of the set time the electromagnet is demagnetized, the see-saw lever 59 returns to its original position, thereby causing the reference weight to return to the tray. Since the output of the reference weight amounts to 30 counts or more, the measuring-in-process circuit (A) is energized and the AND circuit 42 produces the pulse signal γ. Thus the first switch 45 closes the "D" circuit, thereby enabling the output corresponding to the reference weight to be momentarily stored at the register 46. But immediately the stand-by state is restored, and the digital signal is awaited.

So long as the discriminator 41 instructs the state of stand-by, the data is transmitted to the stand-by circuit (C) via the circuit (B) and the AND circuit 42.

Once the measuring has been put into operation, the AND circuit 42 will produce no output signals even when the pulse signal α is output, thereby performing no correction. In addition, since the pulse signal γ is not output, the data is transmitted from the discriminator 41 to the arithmetic unit 47 via the circuit (A). In contrast, during the performance of automatic correction the pulse signal γ has priority over a possible input of load measuring data, which is returned to the discriminator 41 via the switches 45 and 48, and the circuit (E). In this way an erroneous delivery of data is rejected. The instruction button 31 can be pressed at any time to initiate the automatic correction.

In the illustrated embodiment the loaded reference weight is withdrawn in response to the electromagnet magnetizing signal, but it is of course possible that a further reference weight is added in response thereto.

As a modified version of the embodiment a counter can be provided so as to count the measuring-in-process signals (A) or output signals from the arithmetic unit 47, and to transmit the counted results to the AND circuit 42. By this arrangement the electromagnet magnetizing signals β can be output when the desired counts are reached in the counter.

In general, the balance cannot avoid a drift within the range of zero, which is corrected to zero in the known manner before performing an automatic correction. Even if the zero correction is not performed, a differentiation can be corrected by reference to a recorded graph shown in FIG. 8 in which the automatic correction are clearly shown as peaks. The graph shows changes of the data with time.

As evident from the foregoing, the sensitivity of the balance is automatically adjusted at a given interval, thereby eliminating the necessity for warming up the balance to secure a thermal stability in the system. As a result, the balance can be immediately used. Even when the balance undergoes external thermal changes, the automatic adjustment of internal temperature is made, thereby avoiding an error possibly caused by heat. In addition, it is unnecessary to provide variable resistors and any other components for adjusting the sensitivity of the balance, thereby securing a simplified construction.

What is claimed is:

1. An electronic balance comprising:

a weighing means for producing digital output signals as a measured value in response to a force induced upon a tray when an object to be weighed is placed thereon;

a first memory for storing the mass of a reference weight, said mass being known;

a discriminator for signalizing the existence and non-existence of said object on said tray;

a second memory for storing a corrected value obtained by differentiating between a measured value of said reference weight and said mass stored in said first memory when said discriminator signalized that no object is placed on said tray;

an arithmetic unit for correcting a measured value signalized by said weighing means in accordance with said corrected value stored in said second memory when said discriminator signalizes that an object is placed on said tray; and a display for permitting a visual inspection of said arithmetic results obtained by said arithmetic unit.

2. An electronic balance comprising:

a weighing means for producing digital output signals as a measured value in response to a force induced upon a tray when an object to be weighed is placed thereon;

an input unit for inputting the masses of reference weights;

a writing means for transcribing data from said input unit onto a first memory as reference values;

a discriminator for signalizing the existence and non-existence of said object on said tray;

a second memory for storing a corrected value obtained by differentiating between each of measured values of said reference weights and the masses thereof stored in said first memory when said discriminator signalizes that no object is placed on said tray;

an arithmetic unit for correcting a measured value signalized by said weighing means in accordance with said corrected value stored in said second memory when said discriminator signalizes that an object is placed on said tray; and an output unit for outputting said arithmetic results obtained by said arithmetic unit.

3. An electronic balance comprising:

a weighing means for producing digital output signals as a measured value in response to a force included upon a tray when an object to be weighed is placed thereon;

a plurality of loaded reference weights whose masses are known, said reference weights being carried by a support integral with said tray such that a positive or negative addition of their masses can be made;

a memory for storing data with respect to the masses of said reference weights, said data being stored correspondingly to each of said reference weights;

an input unit for transcribing said data onto said memory;

an arithmetic unit for obtaining a measured value on the basis of a positive or negative addition of said reference weights and said data stored in said memory; and an output unit for outputting said arithmetic results obtained by said arithmetic unit.

4. An electronic balance as defined in claim 3, further comprising a counter for counting the frequency of measurements, whereby when the counts reach a desired value, a positive or negative addition of said reference weight is signalized.

5. An electronic balance as defined in claim 3, wherein a positive or negative addition of said reference weight is signalized at an interval selected from the range of 1 to 180 minutes.

6. An electronic balance as defined in claim 5, wherein a positive or negative addition of said reference weight is signalized when a press button for negating the weight of a package is operated.

7. An electronic balance as defined in claim 3, further comprising a press button whereby a positive or negative addition of said reference weight is signalized.

8. An electronic balance comprising:

a weighing means for producing digital output signals as a measured value in response to a force induced upon a tray when an object to be weighed is placed thereon;

a single loaded reference weight whose mass is known, said reference weight being carried by a support integral with said tray such that a positive or negative addition of said mass can be made;

a first memory for storing said mass of said reference weight as a reference value;

a discriminator for signalizing the existence and non-existence of said object on said tray;

a signal generator for intermittently instructing a positive or negative addition of said single reference weight;

a second memory for storing a corrected value obtained by differentiating between a measured value of said reference weight and said mass stored in said first memory when said discriminator signalizes that an object is placed on said tray and when said signal generator signalizes a positive or negative addition of said reference weight;

an arithmetic unit for correcting a measured value signalized by said weighing means in accordance with said corrected value stored in said second memory; and an output unit for outputting arithmetic results obtained by said arithmetic unit.

* * * * *